Sept. 24, 1968     S. A. H. WEXEL     3,402,426
APPARATUS FOR DIVIDING CARCASSES CUT OPEN VENTRALLY
Filed June 24, 1966
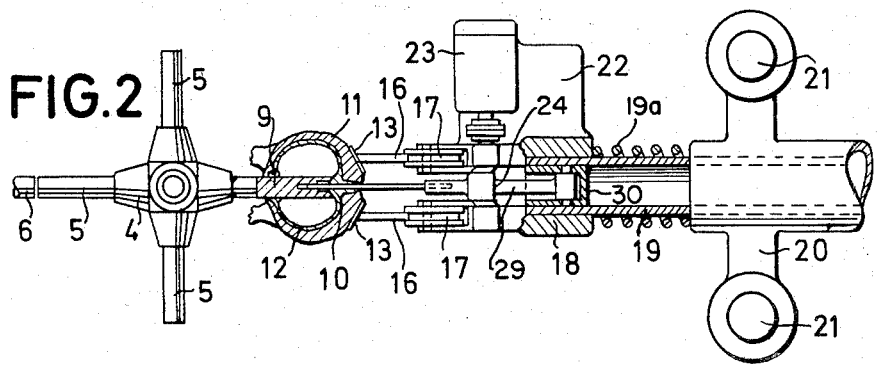
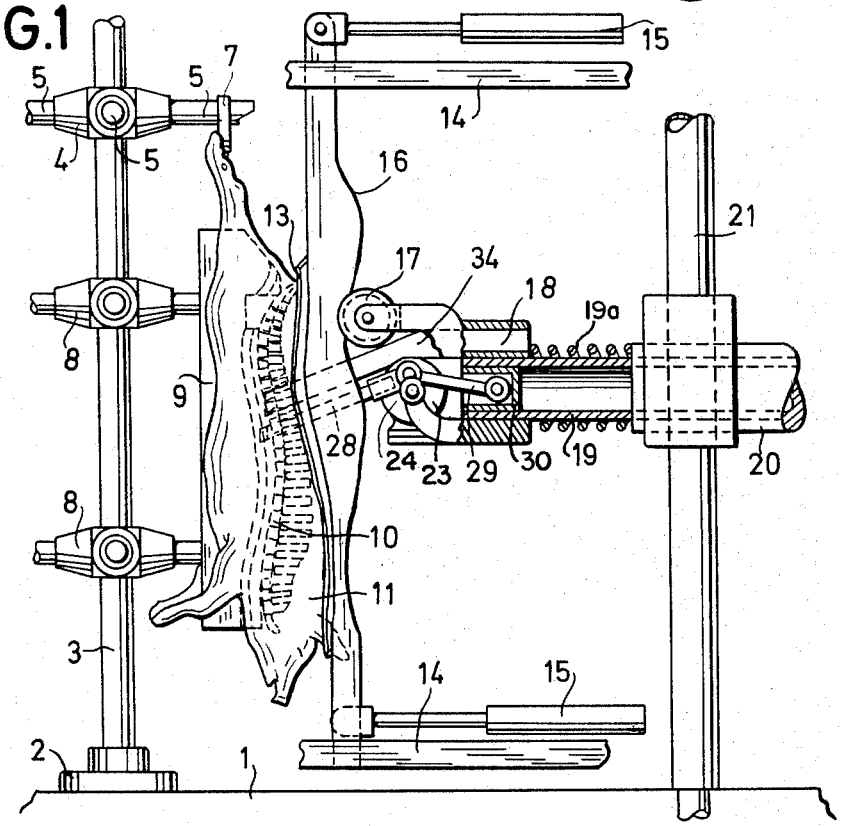
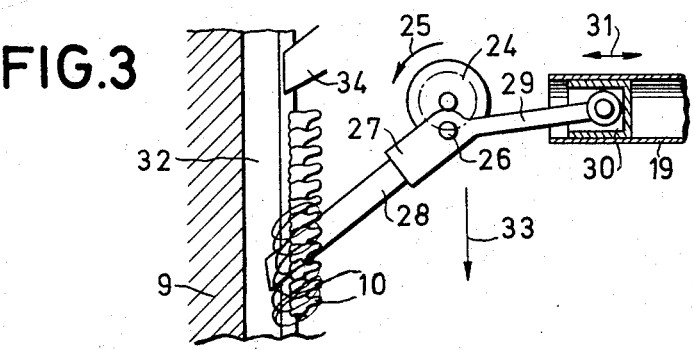

3,402,426
APPARATUS FOR DIVIDING CARCASSES
CUT OPEN VENTRALLY
Svend Anton Hansen Wexel, Skive, Denmark, assignor to Slagteriernes Forskiningsinstitut, Roskilde, Denmark, a corporation of Denmark
Filed June 24, 1966, Ser. No. 560,237
Claims priority, application Denmark, June 6, 1966, 2,902/66
9 Claims. (Cl. 17—23)

ABSTRACT OF THE DISCLOSURE

An apparatus for splitting the backbone of a carcass cut open ventrally, said apparatus comprising two external pressure rails disposed in a spaced relationship and engaging the carcass on one side thereof for maintaining the backbone clamped against an internal supporting rail, a tool means including a tool member disposed in the space between said pressure rails and adapted to engage the backbone, and drive means for driving the tool member against said backbone.

---

After cutting open a carcass at its ventral side and removing the entrails, it is often desirable to halve or divide the carcass along a section following the backbone. The backbone may be cut out in its entirety and removed from the carcass, or it may be split, for example by lengthwise sawing. For the purpose of carrying out this splitting process, several apparatuses have been suggested which comprise a stand for the suspension of the carcass at its hind legs, and a tool such as a circular saw blade, a reciprocating saw blade, or a circulating band saw blade, which by a downwards movement through the carcass divides it into two halves. During the splitting process the carcass, suspended at its hind legs, should be prevented from moving sideways and to this end it is known to fit the stand of the apparatus with a stationary or vertically shiftable support, for example one or more forks which partially embrace the carcass from its dorsal side. In practice, however, one cannot count on attaining in this way a perfect fixation or stabilization of the carcass, and notably of its backbone, and this will amongst other things lead to the consequence that the backbone cannot be split exactly medially. In many cases this is only of minor importance, but in other cases it may be prescribed, for the purposes of inspection, that the backbone is split exactly medially, and in bacon factory practice it has heretofore been necessary to perform this operation manually which requires considerable care and skill on the part of the operator.

The object of the present invention is to eliminate this cumbersome and cost-raising manual work or, in other words, to provide an apparatus which is capable of midsplitting carcasses with the desired accuracy.

More specifically, the invention relates to an apparatus for dividing carcasses, such as pigs' carcasses, cut open ventrally, which apparatus in a manner known comprises a tool which is movable in the longitudinal direction of the backbone with a view to splitting the latter, and means for clamping the carcass during the splitting process. The characteristic feature of the apparatus according to the invention is that the means for clamping the carcass comprises an internal rail forming a support for the underside of the backbone, and two external pressure rails located at either side of the path of travel of the tool and arranged for maintaining the backbone clamped against the internal supporting rail.

This arrangement makes possible so to speak a locking of the backbone of the carcass since, on account of the pressure exerted through the two external rails, the backbone can be pressed into firm engagement with the internal supporting rail. However, a further and very essential advantage is that on being clamped against the internal supporting rail, the backbone may within rather wide limits assume the shape of said rail so that backbones of mutually differing shapes, may, when being clamped in the apparatus, be caused to assume a quite specific desired shape, and then be locked in such shape which is a principal condition for the tool being operable with the desired accuracy with respect to the backbone.

For the purpose of further improving this shaping or straightening effect, the internal supporting rail may advantageously comprise a plane plate having a longitudinal edge to support the underside of the backbone, and being otherwise of such size that in its operative position inside the carcass the plate is wedged in the cut open breast bone and pubic bone thereof. If so, it is possible already during the introduction of the plate-shaped supporting rail into the carcass to straighten the latter so that any lateral crookedness in the backbone is diminished whereby mislocation of the supporting rail with respect to the backbone may be regarded as out of the question.

With a view to attaining the desired accuracy of splitting it is not, however, sufficient that the backbone is safely and precisely secured as care should also be taken to precisely guide the splitting tool. To this end the internal supporting rail of the apparatus may have an edge portion of U-shaped cross-section, in which the flanges operating as the actual support for the backbone form with their inner sides a pair of guide faces for the tool. If so, the tool is forced to operate exactly in the plane along which it is desired to split the backbone.

For the purpose of further guiding the tool in said plane, the external pressure rails may be movable in parallel towards and away from the supporting rail and be provided with a guide path coacting with the tool to determine the depth of penetration of the latter into the carcass. The external pressure rails may also be used for controlling the movement of the tool towards and away from the carcass at the initiation and termination, respectively, of the splitting operation, the tool being supported by a tool holder which is shiftable in the longitudinal direction of the pressure rails and resiliently loaded against the guide path of the pressure rails with which path the tool holder coacts through a roller or a similar friction-reducing member. Through this feature the operation of the apparatus can be simplified in that the tool is automatically brought into and out of its operative position by the movement of the pressure rails towards and away from the carcass.

After the tool, viewed in the direction of operation thereof, the tool holder may advantageously carry a distending member which is shiftable together with the tool. If so, the risk of the tool getting jammed during the performance of the splitting operation is diminished.

The tool used in the apparatus may in a known manner consist of a saw blade, but according to the invention it is preferable that the tool is constituted by a knife to which a chopping and cutting movement may be imparted by means of a driving mechanism during the shifting of the tool holder, and which knife is so designed and disposed that during the splitting operation it cleaves the spinal processes of the backbone from the inside and outwards. When the cleaving is effected in this direction the risk is avoided of the tool sliding off against the rather hard outside of the spinal processes at their peaks and, consequently, the best prospects of attaining an extremely precise midsplitting of the backbone are ensured.

In order that the apparatus of the invention can be conveniently fitted into the normal working cycle in a bacon factory, it is preferable that two or more supporting rails are disposed in parallel on a vertical revolving stand in such positions as to permit of being successively brought into their operative positions opposite a single set of pressure rails with an associated splitting tool. In this case, carcasses suspended at their hind legs from the conventional sliding gambrels on a slide rail, may be directly transferred to the revolving stand so that the backbone of the carcass with its inside enters into engagement with a supporting rail of said stand. At the subsequent rotation of the stand, the carcass may then be brought into the operative position opposite the pressure rails and the splitting tool, and after the termination of the splitting operation a further rotation of the stand will bring the carcass opposite another slide rail section to which the split carcass can be transferred. In this embodiment, the apparatus can have a particularly high working capacity, and especially if the revolving stand comprises three or more supporting rails because then the splitting of one carcass may be effected simultaneously with the removal of a preceding carcass and the introduction of a subsequent carcass.

An embodiment of the apparatus according to the invention is particularly described below with reference to the accompanying drawings, wherein—

FIG. 1 is a side elevation of the apparatus during the splitting of a pig's carcass suspended at its hind legs, FIG. 2 is a top plan view, partially in section, of the apparatus shown in FIG. 1, and FIG. 3 is a side elevation, on a larger scale, of the splitting tool of the apparatus.

In the drawings 1 in FIG. 1 designates a foundation comprising a pedestal base 2 for a vertical rotary column 3 which at top carries a cross 4 with four projecting pins 5 which, when the column 3 is rotated, can be successively brought into position opposite a conveying rail or slide bar 6, FIG. 2, from which the carcasses to be treated are suspended in sliding gambrels 7, FIG. 1.

Through two further crosses 8, FIG. 1, the column 3 carries four supporting rails 9 of which, however, only one is shown in the drawing. Each of said supporting rails consists, in the embodiment shown, of a plate radially disposed with respect to the column 3, the outwardly facing longitudinal edge of which plate forms a support for the underside of the backbone 10 of the carcass 11 to be split. Consequently, the carcasses arriving on the conveying rail section 6 are introduced with their cut open ventral sides facing the column 3 so that on being transferred to a supporting pin 5 in the revolving stand, each carcass is passed in over the subjacent supporting rail 9 until the backbone of the carcass with its underside engages the outer longitudinal edge of the supporting rail. Now, the carcass will be preliminarily fixed with respect to the supporting rail 9, the latter having such size that parts of it are wedged in the split breast bone 12, FIG. 2, of the carcass. Further, an upper portion of the supporting rail 9 may be wedged in the split or sawn-through pubic bone of the carcass.

When the revolving stand is rotated, in the embodiment shown through an angle of 180°, the carcass 11 thus preliminarily fixed may be brought into position opposite a pair of pressure rails 13 which by external engagement with the back of the carcass serve to press the backbone 10 into firm engagement with the edge portion of the supporting rail 9, which edge portion is in FIG. 2 shown having U-shaped cross-section. In so pressing the backbone of the carcass firmly against the supporting rail 9, it is possible to further straighten the backbone so that the latter is fixed in a predetermined position.

In the embodiment shown the external pressure rails 13 are so suspended from stand portions 14 as to be movable in parallel, for example by means of hydraulical or pneumatical cylinders 15, towards and away from the revolving stand 3 with supporting rails 9.

Each of the pressure rails 13 is provided with a rearwardly facing guide path 16 for a roller 17 of a tool holder 18. This tool holder is supported on a horizontal tubular member 19 shiftably disposed in a slide member 20 which is itself vertically shiftable on a pair of columns 21 secured in the foundation 1. By means of an actuating device, not shown, the slide member 20 may be caused to travel up and down on columns 21 whereby the tool holder will perform a corresponding vertical movement of displacement. The tool holder is urged towards pressure units 16 by a compression spring 19a which surrounds tubular member 19 between the end of slide member 20 and tool holder 18.

On a bracket 22 the tool holder 18 supports an electric motor 23 for rotating an eccentric disc 24, see FIG. 3, as indicated by the arrow 25. An eccentric pin 26 of the disc 24 is journalled in a knife holder 27 comprising a knife 28 and a rearwardly extending arm 29 which is hingedly connected with a slide block 30 guided within the tubular member 19. During the rotation of the eccentric disc 24, the slide block 30 is reciprocated as indicated by double arrow 31.

The knife 28 is downwardly inclined and in the operative position its point engages the channel 32 of the edge portion of the supporting rail 9, which portion is of U-shaped cross-section and operates as a lateral guide for the knife point.

When the eccentric disc 24 rotates, the point or front end of the knife 28 will perform a circular movement and when, simultaneously, the tool holder is downwardly displaced as indicated by arrow 33 in FIG. 3, the result will be that the knife performs a chopping or cutting movement with respect to the backbone 10 as indicated in FIG. 3. During this process the knife 28 will split the backbone 10 and with the shown location of the knife the spinal processes of the backbone will be split in the direction from the inside and outwards which involves the advantages explained in the foregoing.

Above the splitting tool 28 proper, the tool holder 18 supports a distending member 34 serving to maintain the incision already produced open to prevent the tool from getting jammed.

Subsequently to the splitting of the carcass 11, the external pressure rails 13 and, consequently, also the tool holder 18 may be withdrawn from the carcass so that the latter after a further rotation of the column 3 can be passed to further processing.

It will be understood that many of the details shown in the drawings may be modified within the scope of the invention. By way of example, instead of a knife it would be possible to use a compass saw-like tool for carrying out the splitting work, and this may be effected in the opposite direction, i.e. from the head towards the tail of the carcass, if such procedure is considered advantageous. Further, during the splitting operation the carcass need not be suspended in the vertical position, nor need it be maintained stationary during the operation. Thus, the relative movement of displacement between the tool and the carcass may also be obtained wholly or partially by moving the carcass.

I claim:

1. An apparatus for splitting the backbone of a carcass cut open ventrally, said apparatus comprising an internal supporting rail adapted to extend through the cut open side of said carcass and support the backbone, two external pressure rails disposed in a spaced relationship and engaging the carcass on the other side thereof for maintaining the backbone clamped against said internal supporting rail, a tool means including a tool member disposed in the space between said pressure rails and adapted to engage said backbone, and drive means for driving said tool member against said backbone.

2. An apparatus as claimed in claim 1, wherein the internal supporting rail comprises a plane plate having a longitudinal edge to support the underside of the backbone and being otherwise of such size that in its operative position within the carcass the plate is wedged in the cut open breast bone and pubic bone thereof.

3. An apparatus as claimed in claim 1, wherein the internal supporting rail has an edge portion of U-shaped cross section in which the flanges operating as the actual support for the backbone form with their inner sides a pair of guide faces for the tool member.

4. An apparatus as claimed in claim 1, further comprising means to move said external pressure rails in parallel towards and away from said supporting rail.

5. An apparatus as claimed in claim 1, wherein each of said external pressure rails is provided with guide means and wherein said tool means includes follower means adapted to engage said guide means to determine the depth of penetration of said tool member into said carcass.

6. An apparatus as claimed in claim 5, wherein said follower means is in the form of a roller.

7. An apparatus as claimed in claim 5, further comprising means to resiliently urge said follower means onto said guide means.

8. An apparatus as claimed in claim 1, wherein said tool means includes a distending member displaceable together with said tool member and extending into the incision produced by the tool member.

9. An apparatus as claimed in claim 1, wherein said tool member is in the form of a knife and wherein said drive means imparts a chopping or cutting movement to said knife so that it cleaves the spinal processes of the backbone from the inside and outwards.

References Cited

UNITED STATES PATENTS

| | | | |
|---|---|---|---|
| 1,015,590 | 1/1912 | Saunders | 17—23 |
| 1,204,345 | 11/1916 | Davey et al. | 17—23 |
| 1,356,169 | 10/1920 | Peters | 17—23 |
| 1,699,695 | 1/1929 | Feister | 17—23 |
| 2,634,457 | 4/1953 | Moyer et al. | 17—23 |
| 3,095,602 | 7/1963 | Kottner | 17—23 |

LUCIE H. LAUDENSLAGER, *Primary Examiner.*